(12) United States Patent
Kobayashi

(10) Patent No.: US 10,935,209 B2
(45) Date of Patent: Mar. 2, 2021

(54) VEHICLE ILLUMINATING DEVICE

(71) Applicant: Koito Manufacturing Co., Ltd., Tokyo (JP)

(72) Inventor: Norihiko Kobayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 185 days.

(21) Appl. No.: 15/641,467

(22) Filed: Jul. 5, 2017

(65) Prior Publication Data
US 2018/0017228 A1  Jan. 18, 2018

(30) Foreign Application Priority Data

Jul. 13, 2016 (JP) .............................. JP2016-138320

(51) Int. Cl.
| | | |
|---|---|---|
| *F21S 45/47* | (2018.01) | |
| *F21S 41/143* | (2018.01) | |
| *F21V 29/74* | (2015.01) | |
| *F21S 41/255* | (2018.01) | |
| *B60Q 1/04* | (2006.01) | |
| *B60Q 1/00* | (2006.01) | |
| *F21S 41/29* | (2018.01) | |

(Continued)

(52) U.S. Cl.
CPC ............ *F21S 45/47* (2018.01); *B60Q 1/0094* (2013.01); *B60Q 1/0483* (2013.01);
(Continued)

(58) Field of Classification Search
CPC .......... F21V 29/74; F21V 23/003; F21V 5/04; F21V 21/30; F21V 29/745; F21V 29/75;
(Continued)

(56) References Cited

U.S. PATENT DOCUMENTS

| | | | | |
|---|---|---|---|---|
| 8,042,980 B2* | 10/2011 | Ookubo | .................. | F21V 13/02 |
| | | | | 362/512 |
| 8,157,422 B2* | 4/2012 | Paik | .................... | F21V 19/0055 |
| | | | | 362/294 |
| 9,074,747 B2* | 7/2015 | Abe | .......................... | F21V 1/00 |
| 9,915,419 B2* | 3/2018 | Potucek | ................ | F21V 31/005 |
| 10,030,819 B2* | 7/2018 | Athalye | .................. | F21V 29/77 |
| 2001/0030866 A1* | 10/2001 | Hochstein | ............... | F21V 29/70 |
| | | | | 362/294 |

(Continued)

FOREIGN PATENT DOCUMENTS

| | | |
|---|---|---|
| CN | 103189681 A | 7/2013 |
| JP | 2012-181952 A | 9/2012 |

(Continued)

OTHER PUBLICATIONS

Englisth translation of an Office Action dated Mar. 31, 2020, issued from the National Intellectual Property Administration, PRC (CNIPA) for Chinese Patent Application No. 201710422063.X (Chinese counterpart) (5 pages).

(Continued)

*Primary Examiner* — Daniel I Walsh
(74) *Attorney, Agent, or Firm* — Abelman, Frayne & Schwab

(57) ABSTRACT

The present disclosure provides a vehicle illuminating device including a lamp housing that functions as a heat sink, a light emitting element disposed in the lamp housing, and a control board that controls the light emitting element. A protruding portion is formed to have an internal space in the lamp housing, and at least a part of the control board is disposed in the internal space. Since the light emitting element is disposed in the lamp housing functioning as a heat sink, and at least a part of the control board is disposed in the internal space of the protruding portion, heat generated in the light emitting element and heat generated in the control board hardly affect each other, and the generation positions of the heat are apart from each other.

12 Claims, 9 Drawing Sheets

(51) Int. Cl.
*F21V 23/00* (2015.01)
*F21V 5/04* (2006.01)
*F21V 21/30* (2006.01)

(52) U.S. Cl.
CPC .......... *F21S 41/143* (2018.01); *F21S 41/295* (2018.01); *F21V 23/003* (2013.01); *F21V 29/74* (2015.01); *F21S 41/255* (2018.01); *F21V 5/04* (2013.01); *F21V 21/30* (2013.01)

(58) Field of Classification Search
CPC ........ F21S 45/47; F21S 41/143; F21S 41/295; F21S 41/25
See application file for complete search history.

(56) References Cited

U.S. PATENT DOCUMENTS

| | | | | |
|---|---|---|---|---|
| 2003/0058656 | A1* | 3/2003 | Yamaguchi | B60Q 1/007 362/547 |
| 2004/0208017 | A1* | 10/2004 | Takiguchi | B60Q 1/10 362/524 |
| 2005/0057187 | A1* | 3/2005 | Catalano | F21V 23/003 315/291 |
| 2005/0135090 | A1* | 6/2005 | Sharrah | F21L 4/027 362/157 |
| 2007/0007898 | A1* | 1/2007 | Bruning | H05B 33/0863 315/34 |
| 2007/0177401 | A1* | 8/2007 | Nakabayashi | F21S 41/148 362/548 |
| 2008/0218993 | A1* | 9/2008 | Li | F21V 5/00 362/84 |
| 2009/0059594 | A1* | 3/2009 | Lin | F21K 9/00 362/294 |
| 2009/0078957 | A1* | 3/2009 | Hoshina | H01L 33/54 257/98 |
| 2009/0097264 | A1* | 4/2009 | Dunn | F21V 29/004 362/373 |
| 2009/0237938 | A1* | 9/2009 | Tsutsumi | H01L 24/37 362/257 |
| 2009/0279310 | A1* | 11/2009 | Freeman | H01J 5/60 362/310 |
| 2009/0296416 | A1* | 12/2009 | Luo | F21K 9/00 362/487 |
| 2009/0303735 | A1* | 12/2009 | Chen | F21V 29/763 362/373 |
| 2010/0110714 | A1* | 5/2010 | Ookubo | F21S 41/147 362/538 |
| 2010/0165652 | A1* | 7/2010 | Ookubo | F21S 41/255 362/522 |
| 2010/0165653 | A1* | 7/2010 | Ookubo | F21S 41/155 362/539 |
| 2010/0165654 | A1* | 7/2010 | Okubo | F21S 41/155 362/539 |
| 2010/0195345 | A1* | 8/2010 | Sugie | F21S 41/196 362/516 |
| 2010/0208483 | A1* | 8/2010 | Hamashima | F21S 41/148 362/520 |
| 2010/0214800 | A1* | 8/2010 | Yashiki | B60Q 1/007 362/546 |
| 2010/0253223 | A1* | 10/2010 | Inoue | F21S 45/435 315/82 |
| 2010/0264799 | A1* | 10/2010 | Liu | F21V 29/83 313/46 |
| 2011/0043091 | A1* | 2/2011 | Lee | F21V 23/006 313/46 |
| 2011/0063849 | A1* | 3/2011 | Alexander | F21V 19/001 362/294 |
| 2011/0121731 | A1* | 5/2011 | Tsutsumi | F21S 41/151 315/77 |
| 2011/0175520 | A1* | 7/2011 | Ramer | F21K 9/64 313/501 |
| 2011/0235357 | A1* | 9/2011 | Myojin | F21S 41/148 362/519 |
| 2011/0242833 | A1* | 10/2011 | Tominaga | F21S 41/148 362/539 |
| 2012/0007506 | A1* | 1/2012 | Ohmi | F21S 41/148 315/77 |
| 2012/0008306 | A1* | 1/2012 | Sasaki | H01L 33/508 362/84 |
| 2012/0038272 | A1* | 2/2012 | De Castro | F21S 41/143 315/35 |
| 2012/0057371 | A1* | 3/2012 | Kai | F21V 3/00 362/646 |
| 2012/0182750 | A1* | 7/2012 | Chung | F21S 45/48 362/509 |
| 2012/0201033 | A1* | 8/2012 | Otani | F21S 41/143 362/307 |
| 2012/0314436 | A1* | 12/2012 | Inoue | F21S 45/47 362/487 |
| 2013/0027958 | A1* | 1/2013 | Okubo | F21S 41/335 362/512 |
| 2013/0051005 | A1* | 2/2013 | Markell | F21V 29/004 362/234 |
| 2013/0051057 | A1* | 2/2013 | Okubo | F21S 41/143 362/520 |
| 2013/0070456 | A1* | 3/2013 | Jang | F21K 9/23 362/235 |
| 2013/0105850 | A1* | 5/2013 | Komatsu | F21S 41/143 257/98 |
| 2013/0141930 | A1* | 6/2013 | Inaba | B60Q 1/068 362/516 |
| 2013/0163265 | A1* | 6/2013 | Abe | F21S 41/143 362/512 |
| 2013/0163267 | A1* | 6/2013 | Okubo | F21S 41/151 362/520 |
| 2013/0188375 | A1* | 7/2013 | Masuda | F21V 5/04 362/509 |
| 2013/0343043 | A1* | 12/2013 | Yu | F21L 4/08 362/183 |
| 2014/0140085 | A1* | 5/2014 | Matsumoto | F21S 48/325 362/516 |
| 2015/0036369 | A1* | 2/2015 | Kim | F21S 45/48 362/487 |
| 2015/0224915 | A1* | 8/2015 | Sazuka | B60Q 1/0094 362/516 |
| 2016/0047519 | A1* | 2/2016 | Shibata | B60Q 1/0094 362/512 |
| 2016/0061434 | A1* | 3/2016 | Huang | F21V 23/002 362/373 |
| 2016/0076743 | A1* | 3/2016 | Deutsch | F21V 7/0091 362/268 |
| 2016/0290581 | A1* | 10/2016 | Kim | F21S 48/1109 |
| 2016/0311360 | A1* | 10/2016 | Wei | B60Q 1/0088 |
| 2017/0009948 | A1* | 1/2017 | Yagi | F21S 41/143 |
| 2017/0043706 | A1* | 2/2017 | Shibata | F21S 45/10 |
| 2017/0096096 | A1* | 4/2017 | Suzuki | F21V 17/164 |
| 2017/0097137 | A1* | 4/2017 | Shibata | F21S 41/19 |
| 2017/0167716 | A1* | 6/2017 | Ezaki | C08K 3/04 |
| 2017/0297479 | A1* | 10/2017 | Debert | F21S 41/141 |
| 2017/0370543 | A1* | 12/2017 | Matsumoto | F21S 41/30 |
| 2018/0017228 | A1* | 1/2018 | Kobayashi | F21V 29/74 |
| 2018/0223096 | A1* | 8/2018 | Kim | C08L 67/02 |

FOREIGN PATENT DOCUMENTS

| | | |
|---|---|---|
| JP | 2014-059981 A | 4/2014 |
| JP | 2014-063698 A | 4/2014 |
| WO | 2015-163150 A | 10/2015 |

OTHER PUBLICATIONS

English translation of an Office Action dated Mar. 10, 2020, issued from the Japan Patent Office (JPO) for Japanese Patent Appln. No. 2016-138320 (Japanese counterpart) (4 pages).

* cited by examiner

VEHICLE ILLUMINATING DEVICE

CROSS-REFERENCE TO RELATED APPLICATIONS

This application is based on and claims priority from Japanese Patent Application No. 2016-138320, filed on Jul. 13, 2016, with the Japan Patent Office, the disclosure of which is incorporated herein in its entirety by reference.

TECHNICAL FIELD

The present disclosure relates to a vehicle illuminating device having a light emitting element that emits light and a control board that controls the light emitting element.

BACKGROUND

Examples of vehicle illuminating devices include a working lamp attached to and used for a construction machine, a construction vehicle, or the like, and a fog lamp attached to a bumper of a vehicle or the like. As the vehicle illuminating device, for example, the working lamp is used to illuminate a dark place at night time, in a tunnel or the like, and for example, the fog lamp is used upon driving through the fog.

In such vehicle illuminating devices, a light emitting element is disposed inside a lamp housing, and light emitted from the light emitting element is collimated by a projection lens and irradiated as illumination light to the outside (see, e.g., WO 2015/163150). In the vehicle illuminating device 1 disclosed in WO 2015/163150, the light emitting element mounted on the control board is disposed inside the lamp housing, and the light emitting element is controlled by the control board to be turned on/off.

When the light emitting element emits light, heat is generated not only in the light emitting element but also in the control board, and the generated heat is transferred to a plurality of heat radiating fins provided in the lamp housing and radiated from the heat radiating fins to the outside.

SUMMARY

In the vehicle illuminating device using the light emitting element as a light source as described above, since heat is generated from both the light emitting element and the control board during the emission of light, it is necessary to secure a high heat radiation property so as to ensure a good driving state of the light emitting element.

However, in the configuration where the light emitting element is mounted on the control board, since the heat generated in the light emitting element and the heat generated in the control board affect each other, and the heat generation positions are close to each other, a sufficient heat radiation performance may not be secured.

Thus, in order to solve the foregoing problems, an object of the present disclosure is to provide a vehicle illuminating device in which, during the driving of a light emitting element, the high heat radiation property is secured so as to ensure the stable driving state of the light emitting element.

First, the vehicle illuminating device according to the present disclosure includes: a lamp housing that functions as a heat sink; a light emitting element disposed in the lamp housing; and a control board that controls the light emitting element. A protruding portion is formed to have an internal space in the lamp housing, and at least a part of the control board is disposed in the internal space.

Accordingly, the light emitting element is disposed in the lamp housing functioning as a heat sink, and at least of the control board is disposed in the internal space of the protruding portion.

Second, in the above-described vehicle illuminating device according to the present disclosure, the internal space is filled with a sealing resin having thermal conductivity, and at least a part of the control board may be sealed in the sealing resin.

Accordingly, heat generated in the control board is radiated from the lamp housing through the sealing resin, and further, the control board is fixed to the lamp housing by the sealing resin.

Third, in the above-described vehicle illuminating device according to the present disclosure, a heat radiating fin may be provided in the lamp housing so as to form a heat radiation space between the heat radiating fin and the protruding portion.

Accordingly, heat transferred to the protruding portion is hardly transferred to the heat radiating fin, and the heat transferred to the protruding portion is easily radiated from the heat radiation space.

Fourth, in the above-described vehicle illuminating device according to the present disclosure, a thickness direction of the heat radiating fin may be a direction orthogonal to an arrangement direction of the heat radiating fin and the protruding portion.

Accordingly, when the arrangement direction of the heat radiating fin and the protruding portion is a vertical direction, heat easily moves upward along the heat radiating fin, and when the arrangement direction of the heat radiating fin and the protruding portion is a left-and-right direction, heat easily flows upward through the heat radiation space.

Fifth, in the above-described vehicle illuminating device according to the present disclosure, the protruding portion has a tip end surface as an end surface in a protrusion direction of the protruding portion, and an outer peripheral surface continuous to an outer periphery of the tip end surface. The outer peripheral surface may be formed in a curved surface of which opposite end portions in the thickness direction of the heat radiating fin are separated from the heat radiating fin as being close to opposite edges of the curved surface.

Accordingly, in a state where the arrangement direction of the heat radiating fin and the protruding portion is the vertical direction so that the protruding portion is positioned at an upper side, and the heat radiating fin is positioned at a lower side, the heat radiated from the heat radiating fin easily flows upward along the outer peripheral surface of the protruding portion.

According to the present disclosure, since the light emitting element is disposed in the lamp housing functioning as a heat sink, and at least a part of the control board is disposed in the internal space of the protruding portion, the heat generated in the light emitting element and the heat generated in the control board hardly affect each other, and the generation positions of the heat are apart from each other. Therefore, during the driving of the light emitting element, the high heat radiation property may be secured so as to ensure the stable driving state of the light emitting element.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment for implementing the vehicle illuminating device of the present disclosure will be described with reference to the accompanying drawings.

In the exemplary embodiment described below, the vehicle illuminating device of the present disclosure is applied to a working lamp mounted on and used for a construction machine or the like. Here, the application scope of the present disclosure is not limited to the working lamp, and the vehicle illuminating device of the present disclosure may be widely applied to a head lamp, a tail lamp, a turn signal lamp, a stop lamp, a daytime running lamp, a cornering lamp, a hazard lamp, a position lamp, a back lamp, a fog lamp, or a combination lamp which is a combination of the lamps.

The vehicle illuminating device 1 is attached to and used for a construction machine such as, for example, a shoveling car, a crane car, or a bulldozer, and may be attached not only to the front surface of the driving box in which an operator gets, but also to a working portion such as, for example, the arm of the shoveling car. In the state where the vehicle illuminating device 1 is attached to the working portion, the direction of the vehicle illuminating device 1 changes depending on the working state of the working portion.

In addition, the vehicle illuminating device 1 includes a lamp housing and a projection lens, and a light emitting element and a control board are disposed inside the lamp housing. In describing the structure of the vehicle illuminating device 1 below, the arrangement direction of the projection lens and the lamp housing will be regarded as a front-and-rear direction, and the arrangement direction of the light emitting element and the control board will be regarded as a vertical direction. However, the vertical, front-and-rear, and left-and-right directions to be described below are merely set for the convenience of description, and the application of the present disclosure is not limited by the directions.

Figure 1:
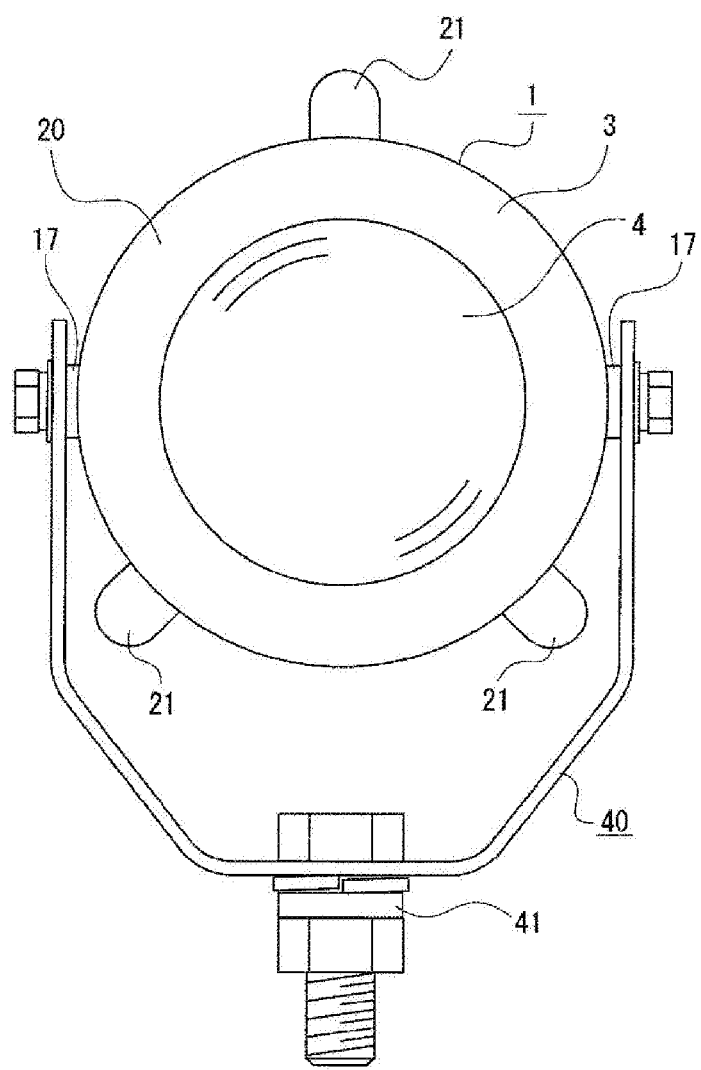
FIG. 1 illustrates a front view of a vehicle illuminating device according to an exemplary embodiment in which a connection arm is also illustrated.
Figure 2:
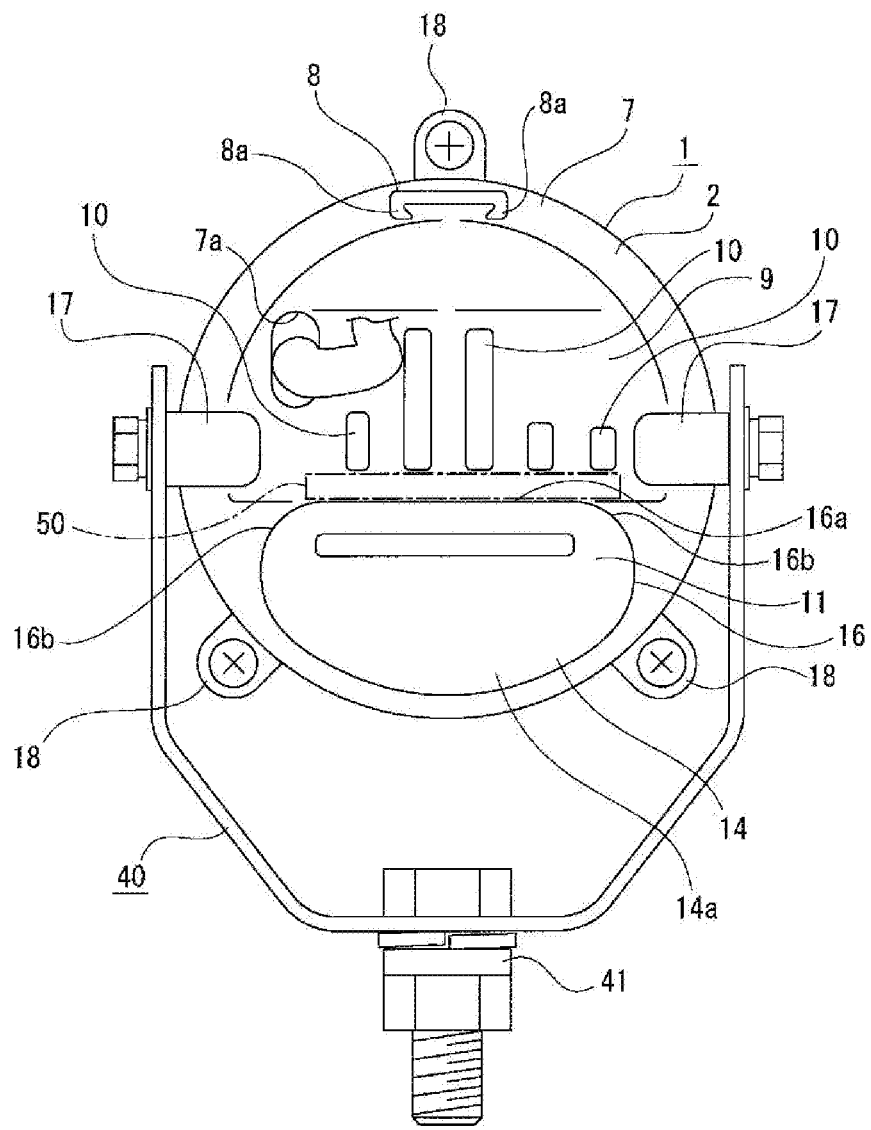
FIG. 2 is a rear view of the vehicle illuminating device in which the connection arm is also illustrated.
Figure 3:
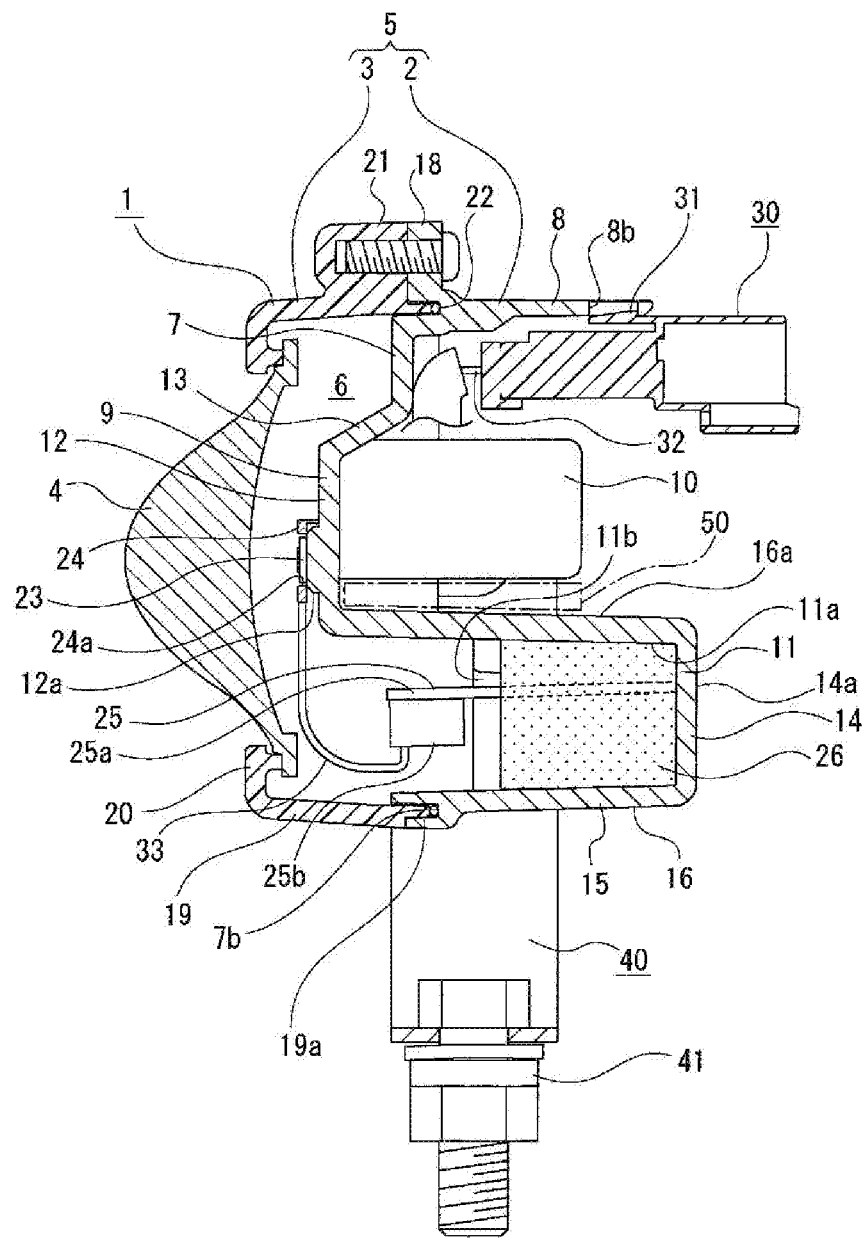
FIG. 3 is a vertical sectional view of the vehicle illuminating device in which the connection arm is also illustrated.

The vehicle illuminating device 1 includes a lamp housing 2 having an opening at the front end thereof, an annular lens holder 3 that closes the opening of the lamp housing 2, and a projection lens 4 held by the lens holder 3 (see FIGS. 1 to 3).

Figure 4:
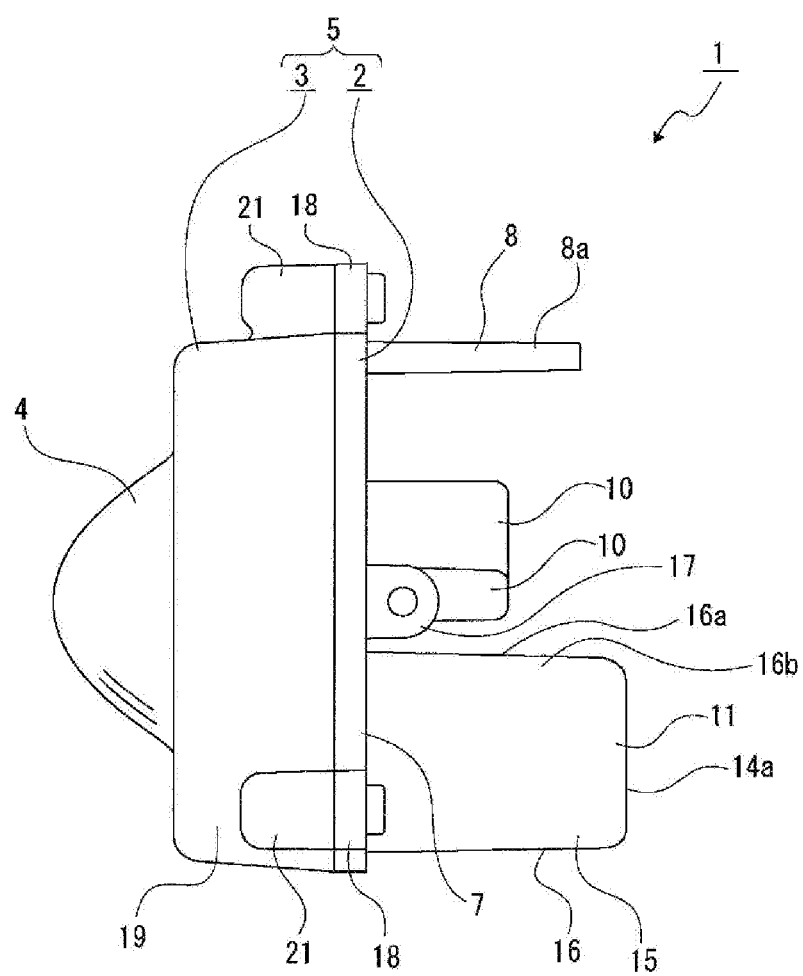
FIG. 4 is a side view of the vehicle illuminating device.
Figure 5:
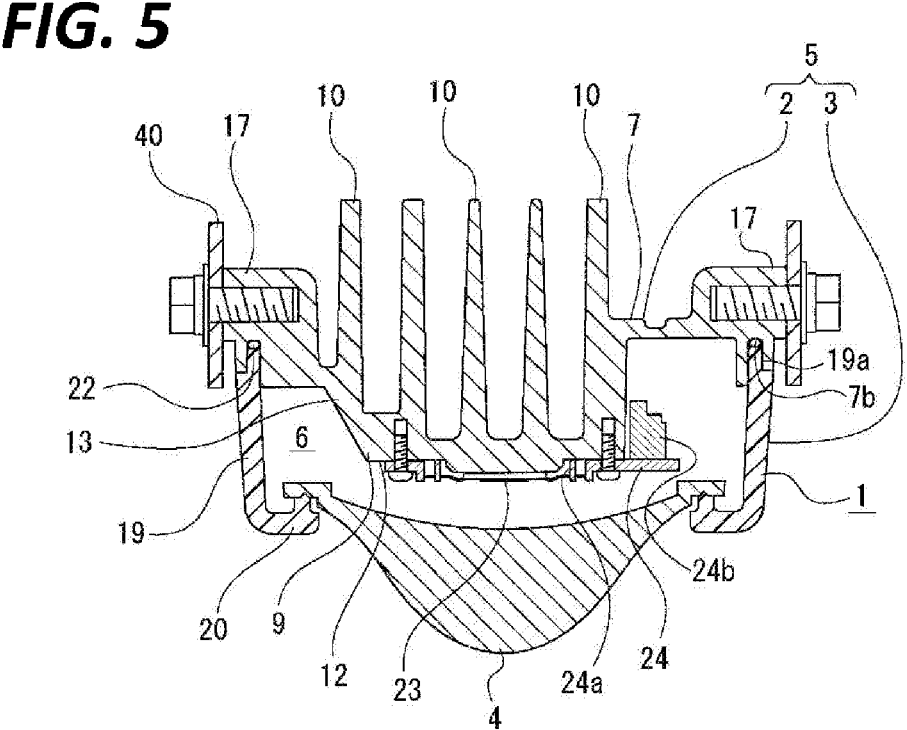
FIG. 5 is a horizontal sectional view of the vehicle illuminating device in which the connection arm is also illustrated.

The lamp housing 2 and the lens holder 3 constitute an external case 5, and the interior of the external case 5 is formed as a disposition space 6 (see FIGS. 3 to 5).

The lamp housing 2 is formed of a material having a high heat radiation property such as, for example, aluminum, copper, or a heat conductive resin containing a heat conductive inorganic filler. The lamp housing constitutes a part of the external case and functions as a heat sink. The lamp housing 2 includes a substantially flat plate shaped base portion 7 that is oriented in the front-and-rear direction, a connector connection portion 8 that protrudes rearward from the upper end of the base portion 7, a placement protrusion 9 that protrudes forward from the center of the base portion 7 in the vertical direction, heat radiating fins 10 each protruding rearward from the center of the base portion 7 in the vertical direction, and a protruding portion 11 that protrudes rearward from the substantially low half portion of the base portion 7.

A cable insertion hole 7a is formed on the base portion 7. An annular insertion groove 7b is formed on the outer peripheral portion of the base portion 7 to be opened forward (see FIGS. 2 and 6).

The left and right opposite ends of the connector connection portion 8 are provided as supports 8a formed in U-shapes, respectively, that face to each other when viewed from the rear side (see FIGS. 2 and 3). An engagement hole 8b is formed on the connector connection portion 8 to vertically penetrate through the connector connection portion 8.

The placement protrusion 9 includes an attachment surface portion 12 that is oriented substantially in the front-and-rear direction, and a peripheral surface portion 13 that protrudes substantially rearward from the outer peripheral edge of the attachment surface portion 12. The rear edge of the peripheral surface portion 13 is continuous to the front edge of the base portion 7 or the protruding portion 11 (see FIGS. 2, 5, and 6). The substantially central portion of the attachment surface portion 12 is provided as an arrangement mount portion 12a positioned slightly ahead of the other potion of the attachment surface portion 12.

The heat radiating fins 10 are provided to be spaced part from each other in the left-and-right direction, and the thickness direction of each heat radiating fin 10 is set as the left-and-right direction (see FIGS. 2, 3, and 5).

The protruding portion 11 has a tip end surface portion 14 that is oriented in the front-and-rear direction, and a peripheral surface portion 15 that protrudes forward from the outer peripheral edge of the tip end surface portion 14, and the front edge of the peripheral surface portion 15 is continuous to the rear edge of the base portion 7 or the placement protrusion 9. The tip end surface portion 14 is positioned behind the rear ends of the heat radiating fins 10.

Figure 6:
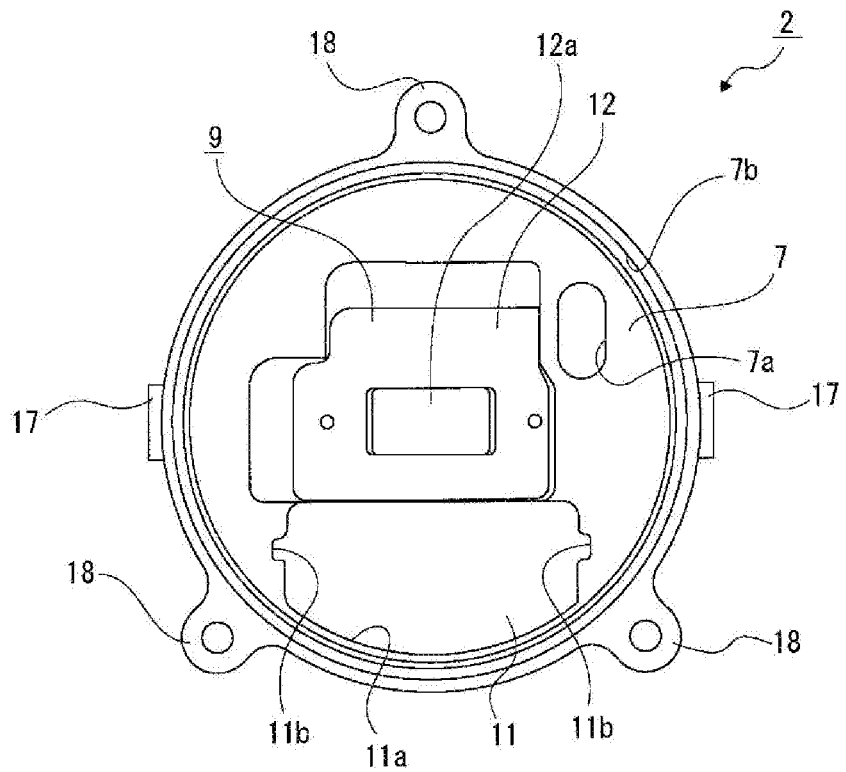
FIG. 6 is a front view of a lamp housing.

The internal space of the protruding portion 11 is formed as a forwardly opened internal space 11a (see FIGS. 3 and 6). Insertion concave portions 11b are formed at the left and right opposite ends of the protruding portion 11 to be opened in the mutually facing directions.

The outer peripheral surface 16 of the peripheral surface portion 15 is coincident, at the rear end thereof, with the outer periphery of the tip end surface 14*a* of the tip end surface portion 14, and includes a facing surface 16*a* that faces the lower surfaces of the heat radiating fins 10, and curved surfaces 16*b* that are continuous to the left and right opposite edges of the facing surface 16*a*, respectively (see FIGS. 2 and 3). The facing surface 16*a* faces upward, and each curved surface 16*b* is formed in an outwardly convex curved surface shape that is displaced downward as being apart from the facing surface 16*a*. Accordingly, each curved surface 16*b* is formed in the curved surface shape that is separated from the heat radiating fins 10 in the thickness direction of the heat radiation fins 10. The distance between the lower surfaces of the heat radiating fins 10 and the facing surface 16*a* is set to be constant, and this space is formed as a heat radiation space 50.

Support protrusions 17 are formed at the left and right opposite ends of the lamp housing 2, respectively (see FIGS. 1, 2, and 4). Outwardly protruding connection protrusions 18 are formed on the lamp housing 2 to be spaced apart from each other at equal intervals in the circumferential direction.

The lens holder 3 includes a substantially cylindrical connection surface portion 19, a holding protrusion 20 that protrudes inward from the front edge of the connection surface portion 19, and connection portions 21 that protrude outward from the connection surface portion 19 (see FIGS. 1, 3 and 5). The rear end of the connection surface portion 19 is provided as an insertion portion 19*a* having a thickness thinner than that of the other portion of the connection surface portion 19. The connection portions 21 are provided to be spaced apart from each other at equal intervals in the circumferential direction.

The insertion portion 19*a* is inserted into the insertion groove 7*b* in a state where a packing 22 is inserted into the insertion groove 7*b*, and the connection portions 21 are attached to the connection protrusions 18, respectively, by screwing or the like so that the lens holder 3 is fixed to the lamp housing 2. Since the lens holder 3 is fixed to the lamp housing 2 in the state where the insertion portion 19*a* is inserted into the insertion groove 7*b* into which the packing 22 has been inserted, a waterproof between the lamp housing 2 and the lens holder 3 is achieved.

The outer periphery of the projection lens 4 is held by the lens holder 3 by being attached to the holding protrusion 20 through, for example, adhesion.

Figure 7:
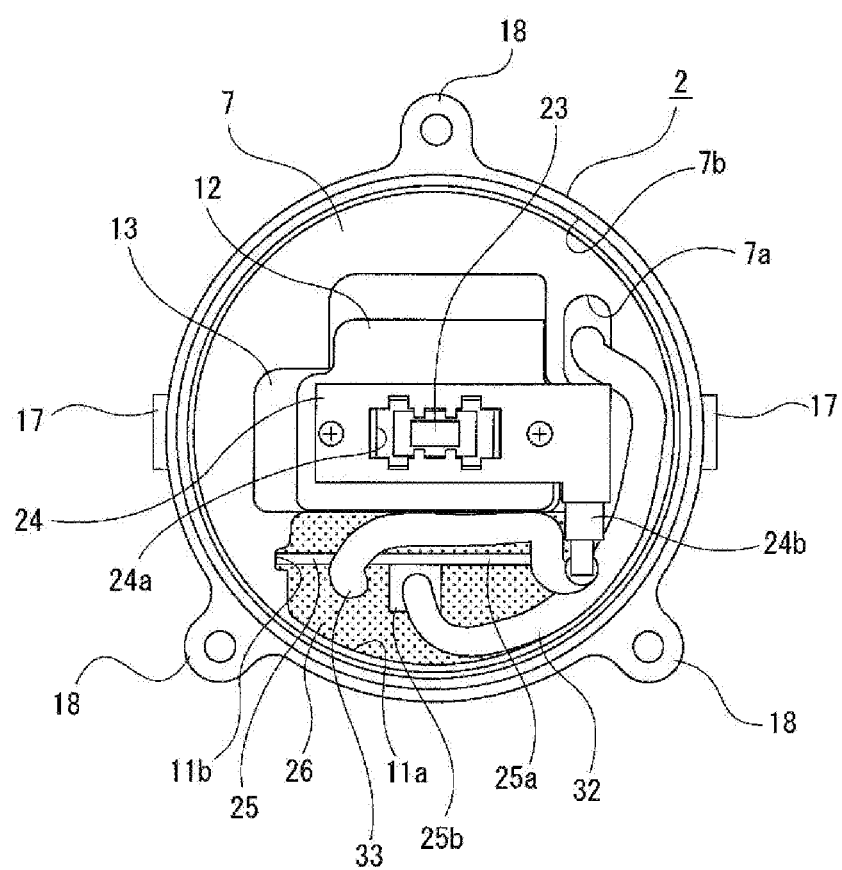
FIG. 7 is a front view of the lamp housing in a state where a light emitting element and others are arranged.

In the lamp housing 2, a light emitting element 23 is placed on the front surface of the arrangement mount portion 12*a* of the placement protrusion 9 (see FIGS. 3, 5, and 7). The front sur face of the arrangement mount portion 12*a* is coated with a heat conductive grease, and the light emitting element 23 is placed on the arrangement mount portion 12*a* through the grease.

The light emitting element 23 is placed on the arrangement mount portion 12*a* in a state of being held by an attachment 24. The attachment 24 is formed in a substantially flat plate shape that is oriented in the front-and-rear direction, and has a holding hole 24*a* that holds the light emitting element 23, at the center of the attachment 24. The attachment 24 is provided with a conducting unit (not illustrated) of which one end is connected to the light emitting element 23, and a power supply unit 24*b* to which the other end of the conducting unit is connected. The attachment 24 is attached to the placement protrusion 9 by screwing or the like.

At least a part of the control board 25 is disposed in the internal space 11*a* formed in the protruding portion 11 of the lamp housing 2. The control board 25 has a function of controlling turning on/off of the light emitting element 23. The control board 25 includes a substantially flat plate shaped circuit board 25*a* that faces upward and downward, and a connection terminal 25*b* connected to the lower surface of the circuit board 25*a*.

The front end of the control board 25 is positioned behind the light emitting element 23. Thus, the light emitted from the light emitting element 23 is not blocked by the control board 25, and a good light emission state in the light emitting element 23 may be secured.

The control board 25, except for a part thereof, is disposed in the internal space 11*a* in a state of being sealed by a sealing resin 26. The sealing resin 26 is formed of a heat conductive material such as, for example, urethane, and is filled in portions of the internal space 11*a* other than the front end thereof.

In addition, the sealing resin 26 may be formed of a resin other than urethane, such as, for example, silicon or epoxy. However, when the sealing resin 26 is formed of urethane, since the urethane is a flexible material and a resin having a high vibration resistance or a high heat resistance, the sealing resin 26 is hardly detached or peeled from the lamp housing 2 when vibration is applied or a temperature rise occurs. Therefore, the stable disposition state of the control board 25 in the internal space 11*a* may be secured.

The control board 25 is sealed in the sealing resin 26 in a state where the left and right opposite ends of the circuit board 25*a* are inserted into the insertion concave portions 11*b*, respectively, from the front side. The portion of the control board 25 which is positioned behind the connection terminal 25*b* is sealed in the sealing resin 26. In a state where a material such as, for example, urethane is filled in the internal space 11*a* of the protruding portion 11, and thus, a part of the control board 25 is embedded in the material, the filling material is heated and cured so that the sealing resin 26 is fixed to the protruding portion 11.

A connector 30 is connected to the connector connection portion 8 of the lamp housing 2 (see FIG. 3). The connector 30 is connected to a power supply by an electric wire (not illustrated). The connector 30 has an elastically deformable connection protrusion 31 on the upper end thereof. The connection protrusion 31 is inserted and supported between the support portions 8*a*, and a part of the connection protrusion 31 is engaged in the opening edge of the engagement hole 8*b* so that the connector 30 is connected to the connector connection portion 8.

A cable 32 is led out from the connector 31 and inserted into the cable insertion hole 7*a* of the base portion 7 to be connected to the connection terminal 25*b* of the control board 25. At this time, for example, a rubber bush that covers the cable 32 is inserted through the cable insertion hole 7*a* so that the cable insertion hole 7*a* is closed. The connection terminal 25*b* of the control board 25 and the power supply unit 24*b* of the attachment 24 are connected to each other by a connection line 33. Accordingly, a current supplied from the power supply to the connector 30 is supplied to the light emitting element 23 through the cable 32, the control board 25, the connection line 33, and the attachment 24.

A connection arm 40 is connected to the vehicle illuminating device 1 (see FIGS. 1 to 3). The connection arm 40 is formed in a substantially U shape, and the opposite ends of the connection arm 40 in the longitudinal direction are pivotably connected to the support protrusions 17. Accordingly, the vehicle illuminating device 1 is pivotable with respect to the connection arm 40 using the support protrusions 17 as fulcrums.

A fastening unit 41 is attached to the center of the connection arm 40 in the longitudinal direction. The fastening unit 41 is fastened to a construction machine or the like, and when the fastening unit 41 is fastened, the vehicle illuminating device 1 is connected to a construction machine or the like through the connection arm 40.

The direction of the vehicle illuminating device 1 with respect to a construction machine or the like may be changed by pivoting the vehicle illuminating device 1 with respect to the connection arm 40 using the support protrusions 17 as fulcrums in the state where the vehicle illuminating device 1 is connected to a construction machine or the like through the connection arm 40, as described above.

In the vehicle illuminating device 1 configured as described above, when light is emitted from the light emitting element 23, the emitted light is collimated by the projection lens 4 and transmits through the projection lens 4 so as to be irradiated as illumination light. When light is emitted from the light emitting element 23, heat is generated in the light emitting element 23 and the control board 25. The heat generated in the light emitting element 23 is mainly transferred to the heat radiating fins 10 of the lamp housing 2 and radiated from the heat radiating fins 10. The heat generated in the control board 25 is mainly transferred from the sealing resin 26 to the protruding portion 11 of the lamp housing 2 so as to be radiated from the protruding portion 11.

Figure 8:
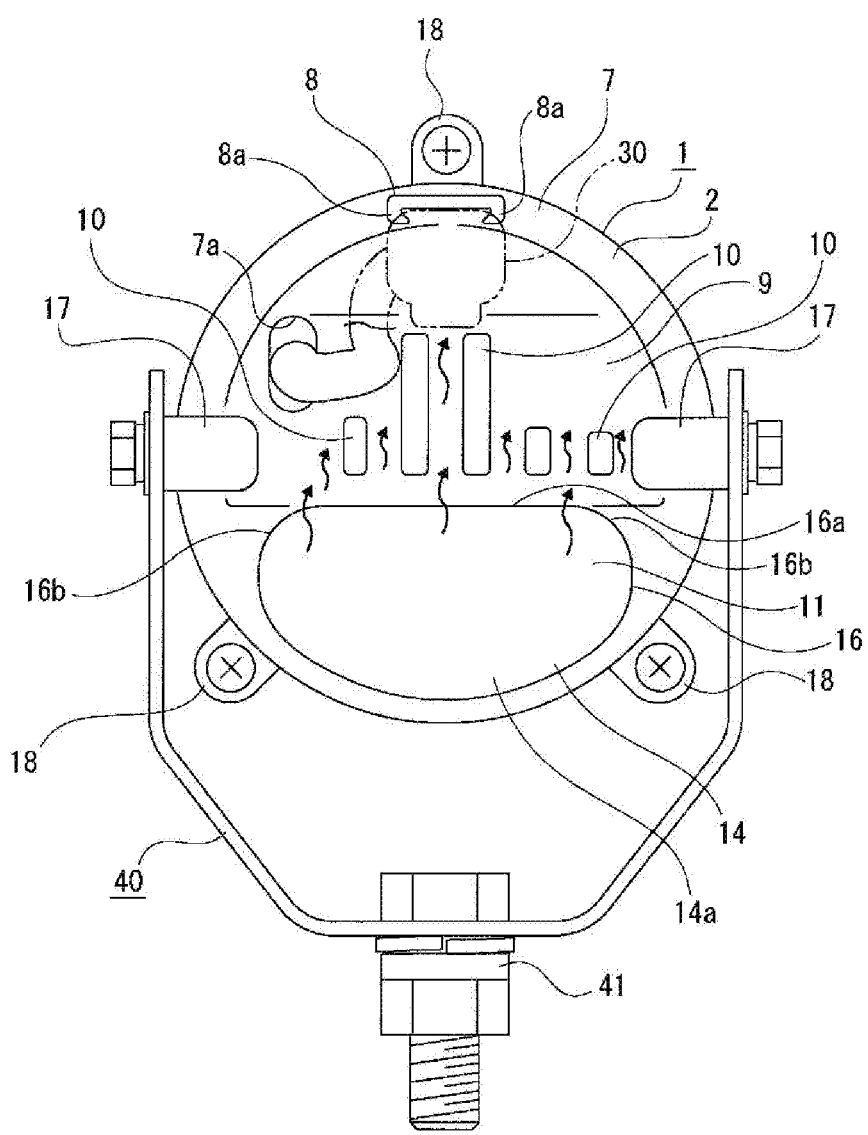
FIG. 8 is a rear view illustrating a heat flow state when a heat radiating fin is positioned at an upper side, and a protruding portion is disposed at a lower side.

At this time, in the state where the arrangement direction of the heat radiating fins 10 and the protruding portion 11 is the vertical direction so that the heat radiating fins 10 are positioned at an upper side, and the protruding portion 11 is positioned at a lower side, the heat radiated from the heat radiating fins 10 mainly flows upward along the left and right opposite lateral surfaces of each of the heat radiating fins 10, and the heat radiated from the protruding portion 11 also mainly flows upward along the left and right opposite lateral surfaces of each of the heat radiating fins 10, as indicated by arrows in FIG. 8. Thus, the good radiation state of the heat generated in the light emitting element 23 and the control board 25 may be secured.

Figure 9:
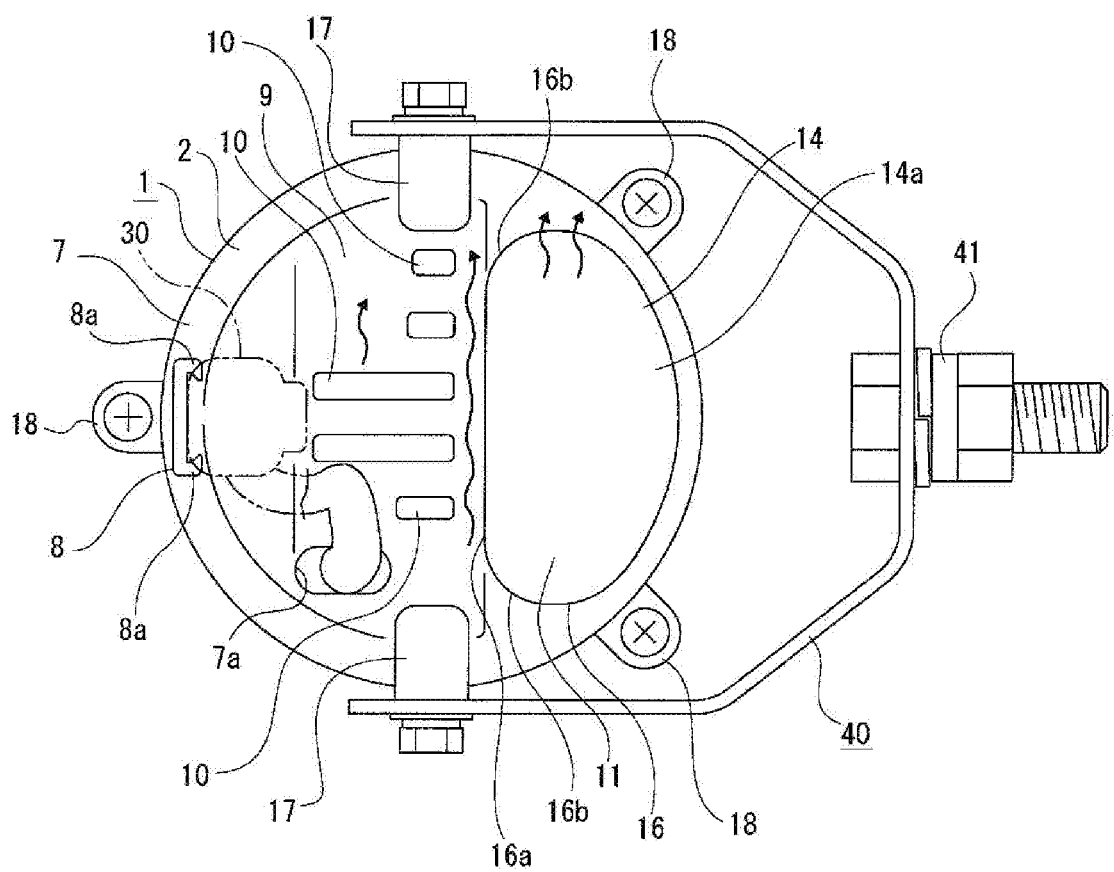
FIG. 9 is a rear view illustrating a heat flow state when the heat radiating fin and the protruding portion are arranged laterally.

Meanwhile, in the state where the arrangement direction of the heat radiating fins 10 and the protruding portion 11 is the left-and-right direction, the heat radiated from the heat radiating fins 10 flows upward from the heat radiating fins 10 as indicated arrows in FIG. 9. Especially, the heat flows upward through the heat radiation space 50 formed between the heat radiating fins 10 and the protruding portion 11. In addition, the heat radiated from the protruding portion 11 flows upward, and especially, the heat radiated from the facing surface 16*a* flows upward through the heat radiation space 50. Thus, the good radiation state of the heat generated in the light emitting element 23 and the control board 25 may be secured.

Figure 10:
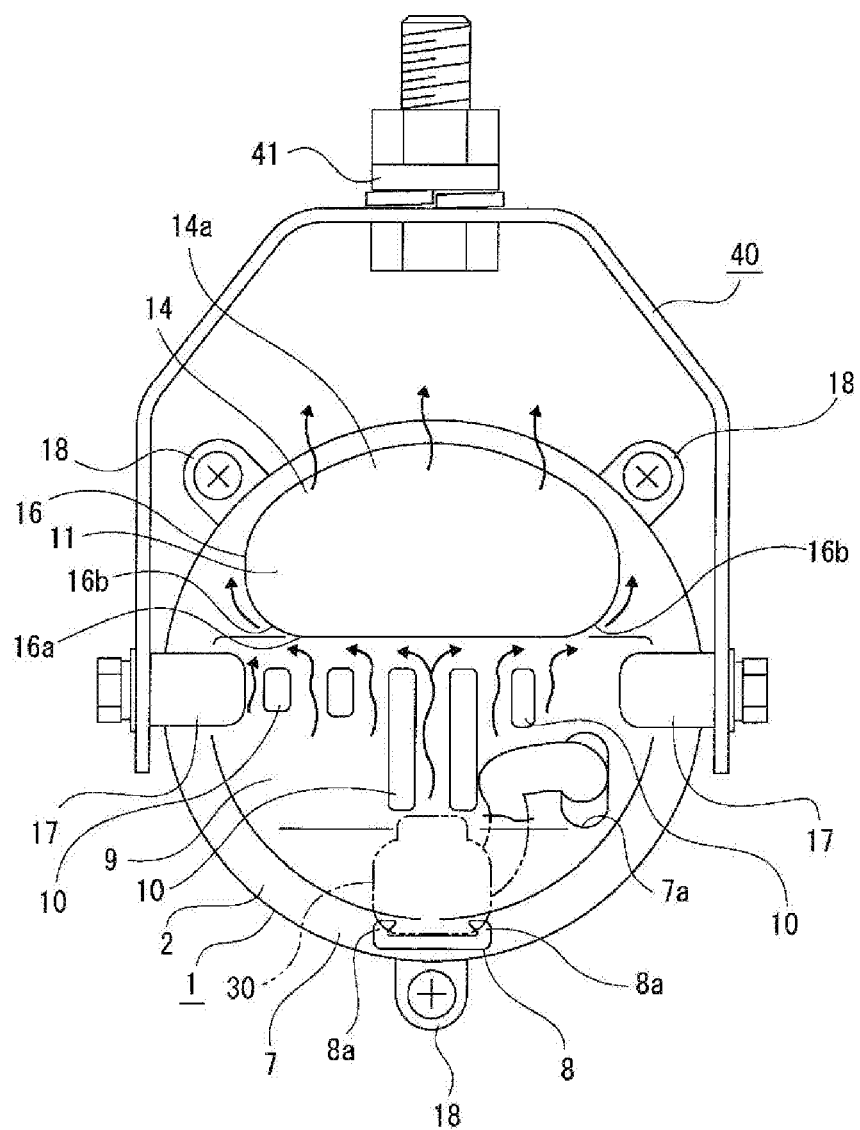
FIG. 10 is a rear view illustrating a heat flow state when the protruding portion is disposed at an upper side, and the heat radiating fin is positioned at a lower side.

Meanwhile, in the state where the arrangement direction of the heat radiating fins 10 and the protruding portion 11 is the vertical direction so that the protruding portion 11 is positioned at an upper side, and the heat radiating fins 10 are positioned at a lower side, the heat radiated from the heat radiating fins 10 flows upward along the left and right opposite lateral surfaces of each of the heat radiation fins 10 as indicated by arrows in FIG. 10. Especially, the heat flows upward along the facing surface 11*a* and the curved surfaces 11*b* of the protruding portion 11 through the heat radiation space 50. In addition, the heat radiated from the protruding portion 11 flows upward. Thus, the good radiation state of the heat generated in the light emitting element 23 and the control board 25 may be secured.

As described above, since the left and right opposite ends of the outer peripheral surface 16 of the protruding portion 11 are formed as the curved surfaces 16*b*, the heat radiated from the heat radiating fins 10 easily flows upward along the outer peripheral surface 16 of the protruding portion 11, in the state where the arrangement direction of the heat radiating fins 10 and the protruding portion 11 is the vertical direction so that the protruding portion 11 is positioned at an upper side, and the heat radiating fins 10 are positioned at a lower side. Thus, the high heat radiation performance may be secured.

As described above, in the vehicle illuminating device 1, since the high heat radiation performance may be secured, the light emitting device 23 may be kept at a specific temperature or lower, irrespective of the direction of the vehicle illuminating device 1. Thus, the stable driving state of the light emitting element 23 may be secured irrespective of the direction of the vehicle illuminating device 1.

As described above, in the vehicle illuminating device 1, the light emitting element 23 is placed on the placement protrusion 9 of the lamp housing 2, and at least a part of the control board 25 is disposed in the internal space 11*a* of the protruding portion 11.

Since the light emitting element 23 is disposed in the lamp housing 2 functioning as a heat sink, and at least a part of the control board 25 is disposed in the internal space 11*a*, the heat generated in the light emitting element 23 and the heat generated in the control board 25 hardly affect each other, and the generation positions of the heat are apart from each other. Thus, during the driving of the light emitting element 23, the high heat radiation property may be secured so as to ensure the stable driving state of the light emitting element 23.

Further, the internal space 11*a* of the protruding portion 11 is filled with a heat conductive sealing resin 26, and at least a part of the control board 25 is sealed in the sealing resin 26.

Accordingly, since the heat generated in the control board 25 is radiated from the lamp housing 2 through the sealing resin 26, and further, the control board 25 is fixed to the lamp housing 2 by the sealing resin 26, reduction of the number of components and improvement of an assembly workability of the lamp housing 2 are accomplished, and then, the improvement of the heat radiation property for the control board 25 may be accomplished.

Further, since at least a part of the control board 25 is disposed in the internal space 11*a* of the protruding portion 11 in the state of being sealed in the sealing resin 26, it is unnecessary to attach the control board 25 to the lamp housing 2 by screwing or the like, and thus, a space for disposing screws is not required. Thus, downsizing of the lamp housing 2 may be achieved.

Further, the heat radiation fins 10 are provided in the lamp housing 2, and the heat radiation space 50 is formed between the heat radiating fins 10 and the protruding portion 11.

Accordingly, the heat transferred to the protruding portion 11 is hardly transferred to the heat radiating fins 10, and the heat transferred to the protruding portion 11 is easily radiated from the heat radiation space 50. Thus, the heat generated in the control board 25 hardly affects the heat radiation property for the heat generated in the light emitting element 23, and further, the high heat radiation property for the heat generated in the control board 25 may be secured.

Further, since the heat radiation space 50 is formed, moisture such as, for example, a raindrop which has entered between the heat radiating fins 10 easily flows through the heat radiation space 50, and thus, the stay of the moisture in the lamp housing 2 may be suppressed.

In addition, the thickness direction of each heat radiation fins 10 is orthogonal to the arrangement direction of the heat radiating fins 10 and the protruding portion 11.

Accordingly, when the arrangement direction of the heat radiating fins 10 and the protruding portion 11 is the vertical direction, heat easily moves upward along the heat radiating fins 10, and when the arrangement direction of the heat radiating fins 10 and the protruding portion 11 is the left-and-right direction, heat easily flows upward through the heat radiation space 50. Thus, the high radiation performance of the vehicle illuminating device 1 may be secured, irrespective of the direction of the vehicle illuminating device 1.

In addition, the vehicle illuminating device 1 is configured such that the heat radiating fins 10 are formed integrally with the lamp housing 2, and the heat generated in the light emitting element 23 and the control board 25 is radiated from the lamp housing 2.

Accordingly, it is unnecessary to dispose a heat sink for transferring the heat generated in the light emitting element 23 and the control board 25 to the lamp housing 2 in the disposition space 6 of the external case 5. Since the heat sink is not required, and the work of attaching the heat sink to the lamp housing 2 is not also required, the reduction of the number of components and the simplification of the structure in the vehicle illuminating device 1 may be achieved.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A lamp housing comprising:
    a flat base having a front side and rear side opposite the front side;
    a light source disposed on the front side of the flat base;
    a heat radiation fin protruding rearwardly from the rear side of the flat base;
    a protrusion protruding rearwardly from the rear side of the flat base having a closed tip end, an open end opposite the closed tip end adjacent the flat base, and an internal space formed within the protrusion between the closed tip end and the open end; and
    a control board that controls the light source and disposed within the internal space,
    wherein a heat radiation space is formed between the heat radiating fin and the protrusion, and
    wherein the tip end of the protrusion has a tip end surface as an end surface and the protrusion has an outer peripheral surface continuous to an outer periphery of the tip end surface, the outer peripheral surface includes a facing surface facing the heat radiating fin and a curved surface forming opposite end portions in the thickness direction of the heat radiating fin are separated from the heat radiating fin by the heat radiation space.

2. The lamp housing of claim 1, wherein the internal space is filled with a sealing resin having thermal conductivity, and at least a part of the control board is sealed in the sealing resin.

3. The lamp housing of claim 2, wherein a thickness direction of the heat radiating fin is a direction orthogonal to an arrangement direction of the heat radiating fin and the protrusion.

4. The lamp housing of claim 3, wherein the tip end of the protrusion has a tip end surface as an end surface and the outer peripheral surface is continuous to an outer periphery of the tip end surface, the outer peripheral surface includes a facing surface facing the heat radiating fin and a curved surface forming opposite end portions in the thickness direction of the heat radiating fin are separated from the heat radiating fin by a heat radiation space.

5. The lamp housing of claim 2, wherein the tip end of the protrusion has a tip end surface as an end surface and the outer peripheral surface is continuous to an outer periphery of the tip end surface, the outer peripheral surface includes a facing surface facing the heat radiating fin and a curved surface forming opposite end portions in the thickness direction of the heat radiating fin are separated from the heat radiating fin by the heat radiation space.

6. The lamp housing of claim 1, wherein a thickness direction of the heat radiating fin is a direction orthogonal to an arrangement direction of the heat radiating fin and the protrusion.

7. The lamp housing of claim 6, wherein the tip end of the protrusion has a tip end surface as an end surface and the outer peripheral surface is continuous to an outer periphery of the tip end surface, the outer peripheral surface includes a facing surface facing the heat radiating fin and a curved surface forming opposite end portions in the thickness direction of the heat radiating fin are separated from the heat radiating fin by a heat radiation space.

8. The lamp housing of claim 1, further comprising at least one support protrusion attached to the flat base, wherein the at least one support protrusion is configured to be connected to a connection arm such that the lamp housing is pivotable with respect to the connection arm.

9. A vehicle lamp comprising:
    a lamp housing having a flat base having a front side and a rear side opposite the front side, the lamp housing configured to radiate heat; and
    a lens holder fixed to the lamp housing,
    wherein the lamp housing further includes:
        a light source disposed on the front side of the base;
        a heat radiation fin protruding rearwardly from the rear side of the flat base;
        a protrusion protruding rearwardly from the rear side of the flat base having a closed tip end, an open end opposite the closed tip end adjacent the flat base, and an internal space formed within the protrusion between the closed tip end and the open end, the protrusion and the heat radiation fin forming a heat radiation space therebetween; and
        a control board that controls the light source and is disposed within the internal space,
    wherein the lens holder further includes:
        a cylindrical connection surface having a rear end attached to the front side of the flat base of the lamp housing; and
        a lens attached to the lens holder.

10. The vehicle lamp of claim 9, wherein the internal space is filled with a sealing resin having a thermal conductivity, and at least a part of the control board is sealed in the sealing resin.

11. The vehicle lamp of claim 9, further comprising at least one support protrusion attached to the flat base, wherein the at least one support protrusion is configured to be connected to a connection arm such that the lamp housing is pivotable with respect to the connection arm.

12. The vehicle lamp of claim 9, further comprising a holding protrusion protruding inward from a front edge of the cylindrical connection surface, the holding protrusion being configured to hold the lens.

* * * * *